(12) United States Patent
Matsumoto et al.

(10) Patent No.: US 12,486,394 B2
(45) Date of Patent: Dec. 2, 2025

(54) MOLDING RESIN COMPOSITION AND MOLDED ARTICLE

(71) Applicant: SEKISUI CHEMICAL CO., LTD., Osaka (JP)

(72) Inventors: Mitsuo Matsumoto, Yamaguchi (JP); Ryota Yamasugi, Yamaguchi (JP); Tomohiro Horinouchi, Yamaguchi (JP); Yoshito Arai, Osaka (JP); Yasunari Kusaka, Osaka (JP); Nami Nakajima, Osaka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 932 days.

(21) Appl. No.: 17/760,865

(22) PCT Filed: Sep. 29, 2020

(86) PCT No.: PCT/JP2020/037002
§ 371 (c)(1),
(2) Date: Mar. 16, 2022

(87) PCT Pub. No.: WO2021/065946
PCT Pub. Date: Apr. 8, 2021

(65) Prior Publication Data
US 2022/0363887 A1    Nov. 17, 2022

(30) Foreign Application Priority Data
Sep. 30, 2019  (JP) .................... 2019-179357

(51) Int. Cl.
*C08L 27/24* (2006.01)

(52) U.S. Cl.
CPC .................... *C08L 27/24* (2013.01)

(58) Field of Classification Search
CPC ....................................... C08L 27/24
See application file for complete search history.

(56) References Cited

U.S. PATENT DOCUMENTS

| | | | |
|---|---|---|---|
| 4,049,517 A | 9/1977 | Adachi et al. | |
| 7,439,293 B2 * | 10/2008 | Perkins | C09K 21/14 524/437 |
| 12,104,051 B2 * | 10/2024 | Matsumura | C08L 27/24 |
| 12,110,385 B2 * | 10/2024 | Matsumura | C08F 8/22 |
| 2010/0063247 A1 | 3/2010 | Sanni et al. | |
| 2010/0316904 A1 | 12/2010 | Zhang | |
| 2014/0309325 A1 | 10/2014 | Inaoka et al. | |
| 2016/0200893 A1 | 7/2016 | Matsumura et al. | |
| 2016/0208072 A1 | 7/2016 | Matsumura et al. | |
| 2017/0051081 A1 | 2/2017 | Munshi et al. | |
| 2017/0183491 A1 * | 6/2017 | Matsumura | C08K 5/1345 |
| 2020/0157335 A1 | 5/2020 | Taniguchi et al. | |

FOREIGN PATENT DOCUMENTS

| | | | |
|---|---|---|---|
| CN | 101541841 | 9/2009 | |
| CN | 104017115 | 9/2014 | |
| CN | 105555859 | 5/2016 | |
| CN | 106232713 | 12/2016 | |
| CN | 109071725 | 12/2018 | |
| EP | 3 173 444 | 5/2017 | |
| EP | 3 498 741 | 6/2019 | |
| JP | 52-148546 | 12/1977 | |
| JP | 3-149244 | 6/1991 | |
| JP | 8-311286 | 11/1996 | |
| JP | 10-60159 | 3/1998 | |
| JP | 10-245492 | 9/1998 | |
| JP | 11-1513 | 1/1999 | |
| JP | 2000-17128 | 1/2000 | |
| JP | 2000-186113 | 7/2000 | |
| JP | 2001-181340 | 7/2001 | |
| JP | 2001-261910 | 9/2001 | |
| JP | 2003-112357 | 4/2003 | |
| JP | 2004-75749 | 3/2004 | |
| JP | 2008-31265 | 2/2008 | |
| JP | 2010-77173 | 4/2010 | |
| JP | 2014-224176 | 12/2014 | |
| JP | 6291612 | 3/2018 | |
| WO | WO03074274 | * 9/2003 | ............. B32B 27/30 |
| WO | 2014/178362 | 11/2014 | |
| WO | 2015/046454 | 4/2015 | |
| WO | 2015/046456 | 4/2015 | |
| WO | 2016/013638 | 1/2016 | |
| WO | 2016/075567 | 5/2016 | |
| WO | 2018/138611 | 8/2018 | |
| WO | 2019/065742 | 4/2019 | |
| WO | 2020/203858 | 10/2020 | |

OTHER PUBLICATIONS

International Search Report issued on Dec. 22, 2020 in corresponding International (PCT) Patent Application No. PCT/JP2020/037002.
International Search Report issued Jun. 23, 2020 in International (PCT) Application No. PCT/JP2020/014183.
China General Plastics Corporation, PVC Resin; (2015) pp. 1-2. (Year: 2015).
Titow, PVC Plastics (1990) pp. 53-101. (Year: 1990).
International Search Report issued Jun. 16, 2020 in International (PCT) Application No. PCT/JP2020/014241.

* cited by examiner

*Primary Examiner* — Shane Fang
(74) *Attorney, Agent, or Firm* — Wenderoth, Lind & Ponack, L.L.P.

(57) ABSTRACT

The present invention aims to provide a resin composition for molding that makes it possible to achieve excellent continuous productivity and to produce a molded article having high surface smoothness, capable of reducing defective molding, less likely to crack during use, and also having excellent shock resistance. The present invention also aims to provide a molded article including the resin composition for molding. Provided is a resin composition for molding, containing: a chlorinated polyvinyl chloride resin; and a melt additive, the resin composition containing three components including a $A_{100}$ component, a $B_{100}$ component, and a $C_{100}$ component, and having a percentage of the $C_{100}$ component [$C_{100}$ component/($A_{100}$ component+$B_{100}$ component+$C_{100}$ component)] of 30% or less, the three components being identified by measuring the resin composition by a solid echo method using pulse NMR at 100° C. to give a free induction decay curve of $^1H$ spin-spin relaxation, and subjecting the free induction decay curve to waveform separation into three curves derived from the $A_{100}$ component, the $B_{100}$ component, and the $C_{100}$ component in order of shorter relaxation time using the least square method.

8 Claims, No Drawings

MOLDING RESIN COMPOSITION AND MOLDED ARTICLE

The present invention relates to a resin composition for molding that makes it possible to achieve excellent continuous productivity and to produce a molded article having high surface smoothness, capable of reducing defective molding, less likely to crack during use, and also having excellent shock resistance. The present invention also relates to a molded article including the resin composition for molding.

BACKGROUND ART

Polyvinyl chloride resins (hereinafter referred to as "PVCs") have been used in a wide range of fields because of their excellent mechanical strength, weather resistance, and chemical resistance. However, PVCs have poor heat resistance, and thus chlorinated polyvinyl chloride resins (hereinafter referred to as "CPVCs"), which are polyvinyl chloride resins chlorinated to have improved heat resistance, have been developed. PVCs have a low thermal deformation temperature and cannot be used with hot water because the upper limit temperature at which they can be used is around 60° C. to 70° C., whereas CPVCs have a thermal deformation temperature higher than PVCs by as much as 20° C. to 40° C., and thus can be used with hot water. For example, CPVCs are suitably used for heat-resistant pipes, heat-resistant joints, heat-resistant valves, and heat-resistant plates.

However, as compared with the common PVCs, CPVCs have high viscosity and long stress relaxation time. This causes molded articles of CPVCs, such as pipes, to have poor surface (inner surface) smoothness. A pipe with poor inner surface smoothness is difficult to use as an ultrapure water pipe or a lined pipe for plants, because such a pipe is susceptible to stagnation due to irregularities, and therefore susceptible to bacteria growth and dust accumulation.

In response to this, Patent. Literature 1 discloses a molded article containing a resin composition, wherein the resin composition contains a chlorinated polyvinyl chloride resin having a chlorine content of 64 to 68% by weight and an oxidized polyethylene wax having an acid value of 15 to 25 and a weight average molecular weight of 2,000 to 3,500.

Patent Literature 2 discloses a molded article containing a resin composition, wherein the resin composition contains a polyvinyl chloride resin, such as a post-chlorinated polyvinyl chloride resin, as well as a rubber shock absorber having a glass transition temperature of 0° C. or lower and a modified olefin wax having a percentage of a specific polar group of 0.1 to 50% by mass, an acid value of 30 to 80 mgKOH/g, and a density of 895 to 960 kg/m$^3$.

CITATION LIST

Patent Literature

Patent Literature 1: JP 2003-112357 A
Patent Literature 2: JP 6291612 B

SUMMARY OF INVENTION

Technical Problem

However, using the resin compositions disclosed in Patent Literatures 1 and 2 may cause adherence of raw materials to a forming tube of a molding machine, and thus may cause defective molding in molded articles. Moreover, continuous, long-time production using such resin compositions may cause irregularities on molded articles in the course of production, which may cause defective molding. Additionally, molded articles obtained using such resin compositions may crack when bent during secondary processing, or may have insufficient shock resistance.

In view of the above problems in the prior art, the present invention aims to provide a resin composition for molding that makes it possible to achieve excellent continuous productivity and to produce a molded article having high surface smoothness, capable of reducing defective molding, less likely to crack during use, and also having excellent shock resistance. The present invention also aims to provide a molded article including the resin composition for molding.

Solution to Problem

The present invention relates to a resin composition for molding, containing: a chlorinated polyvinyl chloride resin; and a melt additive, the resin composition containing three components including a $A_{100}$ component, a $B_{100}$ component, and a $C_{100}$ component, and having a percentage of the $C_{100}$ component [$C_{100}$ component/($A_{100}$ component+$B_{100}$ component+$C_{100}$ component)] of 30% or less, the three components being identified by measuring the resin composition by a solid echo method using pulse NMR at 100° C. to give a free induction decay curve of $^1$H spin-spin relaxation, and subjecting the free induction decay curve to waveform separation into three curves derived from the $A_{100}$ component, the $B_{100}$ component, and the $C_{100}$ component in order of shorter relaxation time using the least square method.

The present invention is described in detail below.

As a result of intensive studies, the present inventors found out that a molded article having high surface smoothness and less likely to crack during use can be obtained by using a resin composition for molding that contains a chlorinated polyvinyl chloride resin and a melt additive and that has a percentage of a $C_{100}$ component of 30% or less as measured by pulse NMR using a predetermined method. The inventors thus completed the present invention.

(Resin Composition for Molding)

The resin composition for molding of the present invention contains three components including a $A_{100}$ component, a $B_{100}$ component, and a $C_{100}$ component, and has a percentage of the $C_{100}$ component [$C_{100}$ component/($A_{100}$ component+$B_{100}$ component+$C_{100}$ component)] of 30% or less, the three components being identified by measuring the resin composition by a solid echo method using pulse NMR at 100° C. to give a free induction decay curve of $^1$H spin-spin relaxation, and subjecting the free induction decay curve to waveform separation into three curves derived from the $A_{100}$ component, the $B_{100}$ component, and the $C_{100}$ component in order of shorter relaxation time using the least square method.

When the percentage of the $C_{100}$ component is within the above range, the processability and the unevenness-preventing properties of a molded article can be improved, making it possible to produce a molded article having high surface smoothness. Moreover, cracking during use of a molded article can be prevented. In addition, deposits on a forming tube of a molding machine can be prevented.

The percentage of the $C_{100}$ component is preferably 0.01% or more, more preferably 0.05% or more, and preferably 25% or less, more preferably 23% or less.

Herein, pulse NMR refers to an analysis involving detecting a response signal to a pulse to obtain a $^1$H nuclear magnetic relaxation time of a sample. A free induction decay curve may be obtained as a pulse response. The free induction decay curve consists of overlapped multiple free induction decay curves derived from multiple components having different relaxation times. The relaxation times or the components thereof of the components having different relaxation times can be identified by waveform separation of the curve using the least square method. The analysis involving separation into three components using pulse NMR described above is a known technique. Examples of literatures describing the technique include JP 2018-2983 A.

The $A_{100}$ component is a component having a short relaxation time in pulse NMR measurement and refers to a hard component with low molecular mobility. The $C_{100}$ component is a component having a long relaxation time in pulse NMR measurement and refers to a soft component with high molecular mobility. The $B_{100}$ component has a relaxation time that is between those of the $A_{100}$ component and the $C_{100}$ component, and has molecular mobility that is between those of the $A_{100}$ component and the $B_{100}$ component.

The percentages of the $A_{100}$ component, $B_{100}$ component, and $C_{100}$ component in the resin composition for molding can be adjusted by appropriately setting the structure of the chlorinated polyvinyl chloride resin, the proportions of the chlorinated polyvinyl chloride resin and the polyvinyl chloride resin, the proportion of the melt additive, the structure of the melt additive, and the characteristics of raw materials of the melt additive, for example.

In the resin composition for molding of the present invention, the percentage of the $A_{100}$ component [$A_{100}$ component/($A_{100}$ component+$B_{100}$ component+$C_{100}$ component)] is preferably 50% or more, more preferably 60% or more, still more preferably 65% or more. The percentage of the $A_{100}$ component is preferably 90% or less, more preferably 80% or less, still more preferably 75% or less.

In the resin composition for molding of the present invention, the percentage of the $B_{100}$ component [$B_{100}$ component/($A_{100}$ component+$B_{100}$ component+$C_{100}$ component)] is preferably 5% or more, more preferably 13% or more, and preferably 25% or less, more preferably 20% or less.

The ratio of the percentage of the $B_{100}$ component to the percentage of the $A_{100}$ component (Percentage of $B_{100}$ component/Percentage of $A_{100}$ component) is preferably 0.1 or more and preferably 0.25 or less.

The ratio of the percentage of the $C_{100}$ component to the percentage of the $A_{100}$ component (Percentage of $C_{100}$ component/Percentage of $A_{100}$ component) is preferably 0.0001 or more and preferably 0.6 or less.

In the resin composition for molding of the present invention, the proportion of the structural unit (a), which is described later, in the chlorinated polyvinyl chloride resin and the percentage of the $C_{100}$ component preferably satisfy the following relation.

1.2≤[Proportion of Structural Unit (a) in Chlorinated Polyvinyl Chloride Resin/Percentage of $C_{100}$ Component in Resin Composition for Molding]≤200

The ratio is more preferably 100 or less.

(Chlorinated Polyvinyl Chloride Resin)

The resin composition for molding of the present invention contains a chlorinated polyvinyl chloride resin.

Preferably, the chlorinated polyvinyl chloride resin contains structural units (a) to (c) represented by the following formula (a) to (c), and the proportion of the structural unit (a) is 5 mol % or more, the proportion of the structural unit (b) is 40 mol % or less, and the proportion of the structural unit (c) is 55 mol % or less, based on the total number of moles of the structural units (a), (b), and (c). Such a chlorinated polyvinyl chloride resin shows uniform gelling characteristics in melt kneading and can provide a molded article with less unevenness on the surface.

In the chlorinated polyvinyl chloride resin, the proportion of the structural unit (a) is more preferably 30.0 mol % or more, still more preferably 35.0 mol % or more, and preferably 90.0 mol % or less, more preferably 60.0 mol % or less, based on the total number of moles of the structural units (a), (b), and (c).

The proportion of the structural unit (b) is preferably 5.0 mol % or more, more preferably 15.0 mol % or more, and more preferably 30.0 mol % or less, still more preferably 25.0 mol % or less, based on the total number of moles of the structural units (a), (b), and (c).

The proportion of the structural unit (c) is preferably 5.0 mol % or more, more preferably 25.0 mol % or more, and more preferably 55.0 mol % or less, still more preferably 40.0 mol %, or less, based on the total number of moles of the structural units (a), (b), and (c).

[Chem. 1]

The molar ratios of the structural units (a), (b), and (c) in the chlorinated polyvinyl chloride resin reflect the site to which chlorine is introduced at the time of chlorination of the polyvinyl chloride resin (PVC). The PVC prior to chlorination is in a state where the proportion of the structural unit (a) is 100 mol %, and the proportions of the structural units (b) and (C) are 0 mol %. As chlorination proceeds, the proportion of the structural unit (a) decreases, while the proportions of the structural units (b) and (c) increase. At this time, nonuniformity of the chlorinated state will increase in a case where the proportion of the structural unit (b), which is unstable, excessively increases, or in a case where the chlorinated site and the unchlorinated site are unevenly present within the same particle of the chlorinated polyvinyl chloride resin. Increased nonuniformity causes variations in gelling characteristics in melt kneading of the chlorinated polyvinyl chloride resin, which will greatly impair the smoothness of the surface of a molded article.

In contrast, in the present invention, owing to the molar ratios of the structural units (a), (b), and (c) adjusted within the above range, the chlorinated polyvinyl chloride resin has high uniformity and can exhibit good gelling characteristics in melt kneading.

The molar ratios of the structural units (a), (b), and (c) in the chlorinated polyvinyl chloride resin can be measured by molecular structure analysis using NMR. NMR analysis can be performed in conformity with the method described in R. A. Komoroski, R. G. Parker, J. P. Shocker, Macromolecules, 1985, 18, 1257-1265.

Preferably, the chlorinated polyvinyl chloride resin contains two components including a $A_{100}$ component and a $B_{100}$ component, and has a percentage of the $B_{100}$ component of less than 15%, the two components being identified by measuring the chlorinated. polyvinyl chloride resin by a solid echo method using pulse NMR at 100° C. to give a free induction decay curve of $^1H$ spin-spin relaxation, and subjecting the free induction decay curve to waveform separation into two curves derived from the $A_{100}$ component and the $B_{100}$ component in order of shorter relaxation time using the least square method. The percentage of the $B_{100}$ component herein means [$B_{100}$ component/($A_{100}$ component +$B_{100}$ component)].

When the percentage of the $B_{100}$ component is within the above range, the processability and the unevenness-preventing properties of a molded article can be improved, making it possible to produce a molded article having high surface smoothness. In addition, cracking during use of a molded article can be prevented.

The percentage of the $B_{100}$ component is more preferably 5% or more and is more preferably 15% or less.

In the chlorinated polyvinyl chloride resin, the percentage of the $A_{100}$ component [$A_{100}$ component/($A_{100}$ component+ $B_{100}$ component)] is preferably 80% or more and is preferably 95% or less.

The relaxation time of the $A_{100}$ component is usually 0.020 milliseconds (hereafter, referred to as ms) or less. The relaxation time of the $B_{100}$ component is usually 0.020 ms or more and less than 0.090 ms.

The relaxation time of the $A_{100}$ component is preferably 0.001 ms or more and preferably 0.020 ms or less.

The ratio of the relaxation time of the $B_{100}$ component to the relaxation time of the $A_{100}$, component (Relaxation time of $B_{100}$ component/Relaxation time of $A_{100}$ component) is preferably 1 or more and is preferably 90 or less.

In the chlorinated polyvinyl chloride resin, the proportion of the structural unit (a) and the percentage of the $B_{100}$ component preferably satisfy the following relation:
1.0≤(Proportion of structural unit (a)/Percentage of $B_{100}$ component)≤20.0.

In the chlorinated polyvinyl chloride resin, the amount of added chlorine is preferably 3.3% by mass or more and is preferably 15.3% by mass or less.

When the amount of added chlorine is 3.3% by mass or more, a molded article to be obtained has sufficient heat resistance. When the amount of added chlorine is 15.3% by mass or less, moldability is improved.

The amount of added chlorine is more preferably 6.3% by mass or more and is more preferably 12.3% by mass or less.

A polyvinyl chloride resin typically has a chlorine content of 56.7% by mass. The amount of added chlorine means the proportion of chlorine introduced into a polyvinyl chloride resin, and can be measured by the method specified in JIS K 7229.

In the chlorinated polyvinyl chloride resin, the amount of added chlorine and the percentage of the $B_{100}$ component preferably satisfy the following relation:
0.1≤(Amount of added chlorine/Percentage of $B_{100}$ component)≤5.0.

The chlorinated polyvinyl chloride resin may have any degree of polymerization, and preferably has a degree of polymerization of 400 to 2,000, more preferably 500 to 1,500.

The degree of polymerization within the above range makes it possible to achieve both fluidity during molding and the strength of a molded article.

The chlorinated polyvinyl chloride resin preferably has a weight average molecular weight of 1,000 or more and 1,000,000 or less, more preferably 10,000 or more and 500,000 or less. The weight average molecular weight is a polystyrene equivalent weight average molecular weight and can be measured by gel permeation chromatography (GPC). Examples of columns used in measuring the weight average molecular weight include Shodex LF-804 (produced by Showa Denko K. K.).

The chlorinated polyvinyl chloride resin may be produced by, for example, a method including preparing a suspension in a reaction vessel by suspending a polyvinyl chloride resin in an aqueous medium, introducing chlorine into the reaction vessel, and heating the suspension to chlorinate the polyvinyl chloride resin. The percentage of the $B_{100}$ component can be adjusted by changing conditions for the chlorination of the polyvinyl chloride resin, such as pressure, temperature, chlorine concentration, hydrogen peroxide concentration, chlorine consumption rate, or stirring conditions.

The polyvinyl chloride resin used may be a vinyl chloride homopolymer, or may be a copolymer of a vinyl chloride monomer and a monomer with unsaturated bond(s) that is copolymerizable with the vinyl chloride monomer, a graft copolymer obtained by graft-copolymerizing a vinyl chloride monomer to a polymer, or the like. These polymers may be used singly or in combinations of two or more.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used singly or in combinations of two or more.

Examples of the α-olefins include ethylene, propylene, and butylene.

Examples of the vinyl esters include vinyl acetate and vinyl propionate.

Examples of the vinyl ethers include butyl vinyl ether and cetyl vinyl ether.

Examples of the (meth)acrylates include methyl (meth) acrylate, ethyl (meth)acrylate, butyl acrylate, and phenyl methacrylate.

Examples of the aromatic vinyls include styrene and α-methyl styrene.

Examples of the vinyl halides include vinylidene chloride and vinylidene fluoride.

Examples of the N-substituted maleimides include N-phenyl maleimide and N-cyclohexyl maleimide.

The polymer to which vinyl chloride is graft copolymerized is not limited as long as vinyl chloride can be graft copolymerized. Examples of such a polymer include ethylene copolymers, acrylonitrile-butadiene copolymers, polyurethane, chlorinated polyethylene, and chlorinated polypropylene. These may be used singly or in combination of two or more.

Examples of the ethylene copolymers include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers.

The reaction vessel may be a commonly used vessel such as a glass-lined stainless steel reaction vessel or a titanium reaction vessel, for example.

The method of preparing the suspension of the polyvinyl chloride resin in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium may be pure water obtained by ion exchange treatment, for example. The amount of the aqueous medium is not limited, and is typically preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from the cylinder.

The gauge pressure in the reaction vessel is not limited. Yet, it is preferably from 0 to 2 MPa, because the higher the chlorine pressure is, the more readily the chlorine will penetrate into the PVC particles.

The method of chlorinating the PVC in the suspended state is not limited. Examples of the chlorination method include a method in which the excitation of bonding of the PVC and chlorine is brought about by thermal energy to accelerate the chlorination (hereinafter referred to as thermal chlorination); and a method in which light energy such as ultraviolet light is applied to accelerate the chlorination by photoreaction (hereinafter referred to as photo-chlorination). The heating method in the chlorination by thermal energy is not limited, and for example, heating with an external jacket from the reactor wall is effective.

The use of light energy such as ultraviolet light requires an apparatus capable of light energy irradiation, such as ultraviolet irradiation under high temperature and high pressure conditions and LED irradiation. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

The chlorinated polyvinyl chloride resin obtained by the photo-chlorination can produce a molded article having high heat resistance and mechanical strength while having excellent gloss.

The thermal chlorination is preferably performed at a temperature of 40° C. to 120° C. When the temperature is excessively low, the rate of chlorination will decrease. When the temperature is excessively high, dehydrochlorination reaction will occur along with the chlorination reaction, causing discoloration of the resulting CPVC. The heating temperature is more preferably 50° C. to 110° C. The heating method is not limited, and heating may be performed with an external jacket from the reaction vessel wall, for example.

In the above chlorination method, preferably, the chlorination is performed while the suspension is stirred. The suspension is stirred preferably under such conditions that the ratio of the vortex volume (unit: L) to the total mass (kg) of the raw material PVC and water is 0.009 to 0.143.

When the ratio is 0.009 or more, chlorine in the gas phase in the reaction vessel can be sufficiently taken in the liquid phase. When the ratio is 0.143 or less, the chlorine taken in the liquid phase is less likely to be re-released into the gas phase, allowing uniform chlorination.

The vortex volume means the volume of a vortex formed at the liquid-gas interface during stirring.

For example, the vortex volume can be calculated using thermal fluid and powder analysis software "R-FLOW" (produced by R-flow Corporation Ltd.).

Specifically, the vortex volume can be calculated based on the distance between the center of the stirring blade and the interface between the gas phase and the liquid phase in stirring. The stirring blade, which is the stirring power source, produces pressure in the liquid in stirring and sets the liquid phase at a positive pressure and the gas phase at a negative pressure. This makes it possible to determine the interface between the gas phase and the liquid phase as the border between the positive pressure and the negative pressure.

The stirring blade rotation rate in stirring is preferably 10 to 500 rpm. The capacity of the vessel is preferably 0.01 m$^3$ to 100 m$^3$.

(Melt Additive)

The resin composition for molding of the present invention contains a melt additive.

The melt additive can decrease the flow viscosity of molten resin during molding processing, improving the surface smoothness of the resulting molded article.

The melt additive has an area ratio of a peak B observed in a range of 0.6 to 1.0 ppm to a peak A observed in a range of 9.5 to 10 ppm (Area of peak B/Area of peak A) of preferably 1 or more and preferably 1,000 or less when a $^1H$ NMR spectrum is measured by solution NMR. The area ratio is more preferably 5 or more, still more preferably 10 or more, particularly preferably 15 or more, and more preferably 900 or less, still more preferably 700 or less, particularly preferably 500 or less.

Specifically, the solution NMR involves dissolving the melt additive in o-dichlorobenzene-d$_4$(orthodichlorobenzene-d$_4$) at 130° C. In particular, any undissolved matter needs to be removed using a filter or the like. The dissolved matter can be measured by 400 MHz $^1$H NMR at 130° C.

The peak A observed in the range of 9.5 to 10 ppm is a peak derived from an aldehyde group. The area of the peak A means the integral from 9.5 to 10 ppm.

The peak B observed in the range of 0.6 to 1.0 ppm is a peak derived from a terminal methyl group. The area of the peak B means the integral from 0.6 to 1.0 ppm.

The melt additive may be produced by the following method, for example.

First, polyethylene or/and polyolefin is/are prepared by a conventionally known process. Examples of the process include low pressure processes (the Ziegler process, the metallocene catalyst process) and middle pressure processes (the Phillips process, the Standard Oil process).

Specifically, a triethylaluminum-titanium tetrachloride solid composite, which is a Ziegler-Natta catalyst, is used as a catalyst, and paraffin, naphthene, a lower aliphatic hydrocarbon, or the like is used as a solvent. Ethylene is blown into the solvent under normal pressure or a pressure of about several atmospheres, and polymerized at a solution temperature of about 60° C. to 100° C. The resulting slurry-like polymerized product is then washed with water to separate and collect the solvent, and dried to prepare polyethylene or/and polyolefin.

Next, the polyethylene or/and polyolefin is/are melted, and to the molten product is introduced oxygen or oxygen-containing gas to cause oxidation reaction to produce the melt additive.

The oxidation process is preferably carried out in a stirring tank reactor.

The oxidation process involves spraying oxygen or oxygen-containing gas in the reactor, filling the reactor with refined polyethylene or/and polyolefin, and heating the polyethylene or/and polyolefin. The heating temperature is preferably 130° C. to 170° C., more preferably 140° C. to 160° C.

Subsequently, oxygen or oxygen-containing gas is fed to the reactor at an oxygen flow rate of 0.5 to 1.5 L per minute per kilogram of the total of polyethylene or/and polyolefin. The pressure inside the reactor is adjusted via a control valve on the outlet side, preferably to 0.5 to 1.0 NPa. After the initial introduction stage, oxidation begins and generates heat. The reactor is thus preferably cooled with an internal cooling coil or an external jacket.

The temperature during reaction is preferably maintained at 130° C. to 170° C., more preferably 140° C. to 160° C.

Sampling is conducted hourly in advance to measure the Area of peak B/Area of peak A by the solution NMR, so as to generate a calibration curve.

The flow of the gas is stopped when the time that the desired area ratio is obtained is reached, and the reactor is aerated to an atmospheric pressure.

The polyethylene or polyolefin preferably has a weight average molecular weight of 800 or more, more preferably 1,000 or more, still more preferably 3,000 or more, particularly preferably 5,000 or more, and preferably 1,000,000 or less, more preferably 200,000 or less, still more preferably 50,000 or less.

The weight average molecular weight can be measured by a method in conformity with JIS-K-7367-1 (viscosity method).

The polyethylene or polyolefin preferably has a melting point of 60° C. or higher, more preferably 80° C. or higher, still more preferably 90° C. or higher, and preferably 150° C. or lower, more preferably 145° C. or lower, still more preferably 140° C. or lower.

The melting point can be measured by differential scanning calorimetry (DSC), for example.

The polyethylene or polyolefin preferably has a density of 650 kg/m$^3$ or more, more preferably 800 kg/m$^3$ or more, and preferably 1,100 kg/m$^3$ or less, more preferably 1,000 kg/m$^3$ or less.

The density can be measured by a method in conformity with JIS K 7112.

The polyethylene or polyolefin preferably has a crystallinity of 30% or more, more preferably 50% or more, still more preferably 61% or more, particularly preferably 70% or more, further particularly preferably 72% or more, and preferably 99% or less, more preferably 90% or less, still more preferably 85% or less.

The crystallinity can be measured by an X-ray diffraction method, for example. The crystallinity within the above range makes it possible to achieve excellent continuous productivity and to produce a molded article having high surface smoothness, capable of reducing defective molding, less likely to crack during use, and also having excellent shock resistance.

The polyethylene or polyolefin preferably has a softening point of 70° C. or higher, more preferably 90° C. or higher, still more preferably 100° C. or higher, and preferably 155° C. or lower, more preferably 150° C. or lower, still more preferably 145° C. or lower.

The softening point can be measured by a method in conformity with JIS K 2207, for example.

The melt additive preferably contains structural units represented by the following formulas (1) to (3).

[Chem. 2]

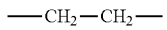
(1)

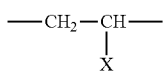
(2)

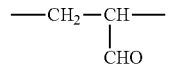
(3)

In the formula (2), X represents at least one selected from the group consisting of an alkyl group, a halogen group, a carboxy group, a hydroxy group, an acetyl group, an acryloyl group, a cyano group, an acrylamide group, a phenyl group, and an ether group.

In the melt additive, the proportion of the structural unit (1) based on the total number of moles of the structural units (1) to (3) is preferably 50 mol % or more, more preferably 80 moles: or more. The proportion of the structural unit (1) is preferably 99.998 mol % or less, more preferably 98 mol % or less.

The proportion of the structural unit (2) is preferably 0.001 mol % or more, more preferably 1 mol % or less. The proportion of the structural unit (2) is preferably 49 mol % or less, more preferably 30 mol % or less.

The proportion of the structural unit (3) is preferably 0.001 mol % or more, more preferably 0.01 mol % or more. The proportion of the structural unit (3) is preferably 1 mol % or less, more preferably 0.7 mol % or less.

The proportions of the structural units (1) to (3) can be measured by molecular structure analysis using NMR, for example.

The melt additive preferably has a weight average molecular weight of 800 or more, more preferably 1,000 or more, still more preferably 3,000 or more, particularly preferably 5,000 or more, and preferably 1,000,000 or less, more preferably 200,000 or less, still more preferably 50,000 or less.

The weight average molecular weight can be measured by a method in conformity with JIS-K-7367-1 (viscosity method).

In the resin composition for molding of the present invention, the ratio of the weight average molecular weight of the melt additive to the weight average molecular weight of the chlorinated polyvinyl chloride resin (Weight average molecular weight of melt additive/Weight average molecular weight of chlorinated polyvinyl chloride resin) is preferably 0.01 or more and 0.55 or less. The weight average molecular weight ratio is more preferably 0.02 or more and. 0.50 or less, still more preferably 0.05 or more and 0.30 or less. The weight average molecular weight ratio within the above range makes it possible to achieve excellent continuous productivity and to produce a molded article having high surface smoothness, capable of reducing defective molding, less likely to crack during use, and also having excellent shock resistance.

When the melt additive contains the structural units represented by the formulas (1) to (3), the structural units represented by the formulas (1) to (3) may be arranged in a random or block manner. The melt additive may have any terminal. Examples thereof include a hydrogen atom, a halogen atom, a hydroxy group, and an aldehyde group. In a preferred embodiment, the melt additive contains the structural units represented by the formulas (1) to (3), and is terminated with at least one selected from the group consisting of a hydrogen atom, a halogen atom, a hydroxy group, and an aldehyde group.

In the structural unit represented by the formula (2), X represents at least one selected from the group consisting of an alkyl group, a halogen group, a carboxy group, a hydroxy group, an acetyl group, an acryloyl group, a cyano group, an acrylamide group, a phenyl group, and an ether group. In particular, X is preferably at least one selected from the group consisting of a hydroxy group, a carboxy group, and an ether group. Here, the ether group has an alkyl group bonded to one end thereof.

In the resin composition for molding of the present invention, the ratio of the structural unit (2) content of the melt additive to the structural unit (b) content of the chlorinated polyvinyl chloride resin (Structural unit (2) content of melt additive/Structural unit (b) content of chlorinated polyvinyl chloride resin) is preferably 0.01 or more and. 1.0 or less. The ratio is more preferably 0.05 or more and 0.8 or less, more preferably 0.06 or more and 0.5 or less. The ratio within the above range makes it possible to achieve excellent continuous productivity and to produce a molded article having high surface smoothness, capable of reducing defective molding, less likely to crack during use, and also having excellent shock resistance.

The melt additive preferably has a melting point of 60° C. or higher, more preferably 80° C. or higher, still more preferably 90° C. or higher, particularly preferably 110° C. or higher, and preferably 150° C. or lower, more preferably 145° C. or lower, still more preferably 140° C. or lower. The melting point within the above range makes it possible to achieve excellent continuous productivity and to produce a molded article having high surface smoothness, capable of reducing defective molding, less likely to crack during use, and also having excellent shock resistance.

The melting point can be measured by differential scanning calorimetry (DSC), for example.

The melt additive preferably has a density of 650 kg/m$^3$ or more, more preferably 800 kg/m' or more, and preferably 1,100 kg/m$^3$ or less, more preferably 1,000 kg/m$^3$ or less.

The density can be measured by a method in conformity with JIS K 7112, for example.

The melt additive preferably has a crystallinity of 30% or more, more preferably 50% or more, still more preferably 70% or more, and preferably 99% or less, more preferably 90% or less, still more preferably 85% or less. The crystallinity can be measured by X-ray diffractometry.

The melt additive preferably has a softening point of 70° C. or higher, more preferably 90° C. or higher, still more preferably 100° C. or higher, and preferably 155° C. or lower, more preferably 150° C. or lower, still more preferably 145° C. or lower. The softening point can be measured by a method in conformity with JIS K 2207, for example.

The melt additive preferably has a melt viscosity at 170° C. of 10 to 3,000 mPa·s, more preferably 50 to 2,000 mPa·s, still more preferably 100 to 1,000 mPa·s. The melt viscosity can be measured using a dynamic viscoelasticity measuring apparatus, for example.

In the resin composition for molding of the present invention, the amount of the melt additive based on 100 parts by mass of the chlorinated polyvinyl chloride resin is preferably 0.01 parts by mass or more, more preferably 0.02 parts by mass or more, still more preferably 0.1 parts by mass or more, particularly preferably 0.5 parts by mass or more. The amount of the melt additive based on 100 parts by mass of the chlorinated polyvinyl chloride resin is preferably 18 parts by mass or less, more preferably 13 parts by mass or less, still more preferably 10 parts by mass or less, particularly preferably 7.5 parts by mass or less. The melt additive contained in an amount within the above range makes it possible to provide a molded article having excellent surface smoothness without scorching or foaming during molding.

(Other Additives)

The resin composition for molding of the present invention may optionally contain additives such as thermal stabilizers, lubricants, processing aids, impact modifiers, heat resistance improvers, antioxidants, ultraviolet absorbents, light stabilizers, fillers, and pigments.

Examples of the thermal stabilizers include, but not limited to, organotin stabilizers, lead stabilizers, calcium-zinc stabilizers, barium-zinc stabilizers, and barium-cadmium stabilizers.

Examples of the organotin stabilizers include dibutyl tin mercapto, dioctyl tin mercapto, dimethyl tin mercapto, dibutyl tin mercapto, dibutyl tin maleate, dibutyl tin maleate polymers, dioctyl tin maleate, dioctyl tin maleate polymers, dibutyl tin laurate, and dibutyl tin laurate polymers.

Examples of the lead stabilizers include lead stearate, dibasic lead phosphite, and tribasic lead sulfate. These may be used singly or in combination of two or more thereof.

The thermal stabilizer content based on 100 parts by mass of the chlorinated polyvinyl chloride resin is preferably 0.4 parts by mass or more, more preferably 0.6 parts by mass or more, and preferably 10 parts by mass or less, more preferably 7 parts by mass or less. A thermal stabilizer contained in an amount within the above range can further improve thermal stability while maintaining good appearance of a molded article.

Examples of the lubricants include internal lubricants and external lubricants. Internal lubricants are used to reduce the flow viscosity of molten resin during molding processing and thus prevent the generation of frictional heat. Examples of the internal lubricants include, but not limited to, higher alcohol esters such as butyl stearate, higher alcohols such as lauryl alcohol and stearyl alcohol, epoxy soybean oil, polyalcohol esters such as glycerol monostearate, higher fatty acids such as stearic acid, and bisamides. These may be used singly or in combination of two or more thereof. Note that the lubricants are different from the melt additive.

External lubricants are used to improve the slip effect between molten resin and a metal surface during molding processing. Examples of the external lubricants include, but not limited to, ester waxes such as fatty acid ester lubricants and montanic acid waxes. These may be used singly or in combination of two or more thereof.

Examples of the processing aids include, but not limited to, acrylic processing aids such as alkyl acrylate-alkyl methacrylate copolymers having a mass average molecular weight of 100,000 to 2,000,000. Examples of the acrylic processing aids include, but not limited to, n-butyl acrylate-methyl methacrylate copolymers and 2-ethylhexyl acrylate-methyl methacrylate-butyl methacrylate copolymers. These may be used singly or in combination of two or more thereof.

Examples of the impact modifiers include, but not limited to, styrene-conjugated diene copolymers such as methyl methacrylate-butadiene-styrene copolymers (NIBS) and acrylonitrile-butadiene-styrene copolymers (ABS), acrylic copolymers, chlorinated polyethylene, and acrylic rubber.

Examples of the heat resistance improvers include, but not limited to, α-methylstyrene resins and N-phenylmaleimide resins.

Examples of the antioxidants include, but not limited to, phenolic antioxidants.

Examples of the light stabilizers include, but not limited to, hindered amine light stabilizers.

Examples of the ultraviolet absorbents include, but not limited to, salicylate ultraviolet absorbents, benzophenone ultraviolet absorbents, benzotriazole ultraviolet absorbents, and cyanoacrylate ultraviolet absorbents.

Examples of the fillers include, but not limited to, calcium carbonate and talc.

Examples of the pigments include, but not limited to, organic pigments such as azo pigments, phthalocyanine pigments, threne pigments, and dye lake pigments; and inorganic pigments such as oxide pigments, molybdenum chromate pigments, sulfide/selenide pigments, and ferrocyanide pigments.

The resin composition for molding of the present invention may be produced by, for example, a method including mixing the chlorinated polyvinyl chloride resin with the melt additive and other additives.

Any mixing method may be used. Examples thereof include a hot blending method and a cold blending method.

In addition, a molded article molded from the resin composition for molding of the present invention is provided. The present invention also encompasses such a molded article.

The molding method may be any conventionally known molding method, for example, extrusion molding or injection molding.

The molded article of the present invention has excellent thermal stability and good appearance. Therefore, the molded article of the present invention can be suitably used in applications such as building components, plumbing materials and equipment, and housing materials.

The lower limit of the arithmetic average wavelength (Zλa) of the molded article of the present invention is preferably 50 μm, and the upper limit thereof is preferably 400 μm. Such a molded article can have high surface smoothness. A more preferred range is 60 to 350 μm.

The arithmetic average wavelength (Zλa) can be measured using a 3D measurement system (produced by Keyence Corporation, VR-3100), for example.

Advantageous Effects of Invention

The present invention can provide a resin composition for molding that makes it possible to achieve excellent continuous productivity and to produce a molded article having high surface smoothness, capable of reducing defective molding, less likely to crack during use, and also having excellent shock resistance. The present invention can also provide a molded article including the resin composition for molding.

DESCRIPTION OF EMBODIMENTS

The present invention is hereinafter described in more detail with reference to examples; however, the present invention should not be limited to the examples.
(Preparation of Chlorinated Polyvinyl Chloride Resin A)

A glass-lined reaction vessel having an inner capacity of 300 L was charged with 130 kg of deionized water and 50 kg of a polyvinyl chloride resin having an average degree of polymerization of 1,000. They were stirred to disperse the polyvinyl chloride resin in water to prepare an aqueous suspension. Subsequently, the inside of the reaction vessel was depressurized to remove oxygen (oxygen content 100 ppm). Thereafter, while stirring was performed such that the vortex formed at the liquid-gas interface by stirring had a vortex volume of 2.2 L, chlorine (oxygen content 50 ppm) was introduced at a partial pressure of chlorine of 0.04 MPa. After three hours, heating was started, and irradiation of ultraviolet light having a wavelength of 365 nm was performed at an irradiation intensity of 350 W with a high-pressure mercury lamp, thereby starting chlorination reaction.

Then, the chlorination temperature was kept at 70° C. and the partial pressure of chlorine was kept at 0.04 MPa. The average chlorine consumption rate was adjusted to 0.02 kg/PVC-kg·5 min. When the amount of added chlorine reached 10.6% by mass, the irradiation of ultraviolet light with the high-pressure mercury lamp and the supply of chlorine gas were terminated, whereby chlorination was terminated.

Next, unreacted chlorine was removed by nitrogen gas aeration, followed by washing with water, dehydration, and drying. Accordingly, a powdery chlorinated polyvinyl chloride resin (amount of added chlorine: 10.6% by mass) was obtained.
(Preparation of Chlorinated Polyvinyl Chloride Resin B)

A glass-lined reaction vessel having an inner capacity of 300 L was charged with 130 kg of deionized water and 50 kg of a polyvinyl chloride resin having an average degree of polymerization of 700. They were stirred to disperse the polyvinyl chloride resin in water to prepare an aqueous suspension. Subsequently, the inside of the reaction vessel was depressurized to remove oxygen (oxygen content 100 ppm). Thereafter, while stirring was performed such that the vortex formed at the liquid-gas interface by stirring had a vortex volume of 2.2 L, chlorine (oxygen content 50 ppm) was introduced at a partial pressure of chlorine of 0.04 MPa. After three hours, heating was started, and irradiation of ultraviolet light having a wavelength of 365 nm was performed at an irradiation intensity of 350 W with a high-pressure mercury lamp, thereby starting chlorination reaction.

Then, the chlorination temperature was kept at 70° C. and the partial pressure of chlorine was kept at 0.04 NPa. The average chlorine consumption rate was adjusted to 0.02 kg/PVC-kg·5 min. When the amount of added chlorine reached 10.6% by mass, the irradiation of ultraviolet light with the high-pressure mercury lamp and the supply of chlorine gas were terminated, whereby chlorination was terminated.

Next, unreacted chlorine was removed by nitrogen gas aeration, followed by washing with water, dehydration, and drying. Accordingly, a powdery chlorinated polyvinyl chloride resin (amount of added chlorine: 10.6% by mass) was obtained.
(Preparation of Chlorinated Polyvinyl Chloride Resin C)

A glass-lined reaction vessel having an inner capacity of 300 L was charged with 130 kg of deionized water and 50 kg of a polyvinyl chloride resin having an average degree of polymerization of 1,000. They were stirred to disperse the polyvinyl chloride resin in water to prepare an aqueous suspension. Subsequently, the inside of the reaction vessel was depressurized to remove oxygen (oxygen content 100 ppm). Thereafter, while stirring was performed such that the vortex formed at the liquid-gas interface by stirring had a vortex volume of 2.2 L, chlorine (oxygen content 50 ppm) was introduced at a partial pressure of chlorine of 0.04 MPa. After three hours, heating was started, and irradiation of ultraviolet light having a wavelength of 365 nm was performed at an irradiation intensity of 350 K with a high-pressure mercury lamp, thereby starting chlorination reaction.

Then, the chlorination temperature was kept at 70° C. and the partial pressure of chlorine was kept at 0.04 MPa. The average chlorine consumption rate was adjusted to 0.02 kg/PVC-kg·5 min. When. the amount of added chlorine reached 5.3% by mass, the irradiation of ultraviolet light with the high-pressure mercury lamp and the supply of chlorine gas were terminated, whereby chlorination was terminated.

Next, unreacted chlorine was removed by nitrogen gas aeration, followed by washing with water, dehydration, and drying. Accordingly, a powdery chlorinated polyvinyl chloride resin (amount of added chlorine: 5.3% by mass) was obtained.

(Evaluation of Chlorinated Polyvinyl Chloride Resin)
(1) Measurement of Amount of Added Chlorine The amount of added chlorine in the obtained chlorinated polyvinyl chloride resin was measured in conformity with JIS K 7229.

(2) Molecular Structure Analysis

The molecular structure of the obtained chlorinated polyvinyl chloride resin was analyzed in conformity with the NMR measurement method described in R. A. Komoroski, R. G. Parker, J. P. Shocker, Macromolecules, 1985, 18, 1257-1265 so as to determine the amount of the structural units (a), (b), and (c).

The NMR measurement conditions were as follows.
Apparatus: ET-NMRJEOLJNM-AL-300
Measured nuclei: 13C (proton complete decoupling)
Pulse width: 90°
PD: 2.4 sec
Solvent: o-dichlorobenzene:deuterated benzene (C5D5) =3:1
Sample concentration: about 20%
Temperature: 110° C.
Reference material: central signal for benzene set to 128 ppm
Number of scans: 20,000

(3) Weight Average Molecular Weight Measurement

A sample was dissolved in THF, and filtered through a filter having a pore size of 0.2 μm before the weight average molecular weight was measured using a GPC unit (pump unit: PU-4180, detector unit: RI-4030, column oven: CO-4065) produced by JASCO Corporation and SHODEX columns LF-804 (two columns connected). The measurement was performed by eluting the sample at a measurement flow rate of 0.7 ml/min and an oven temperature of 40° C. and determining the weight average molecular weight using a calibration curve base generated with standard polystyrene equivalent.

(Preparation of Melt Additive X1)

Raw material polyethylene (5 kg) was fed and melted in a 23-L small polymerizer equipped with a thermometer, a manometer, a stirring device, a gas inlet tube, and a gas exhaust tube. After the internal temperature reached 145° C., the stirring device was set to 250 rotations/min, and air was introduced into the molten product at 1.0 L/min. The raw material polyethylene used was Hi-WAX 800P (produced by Mitsui Chemicals, Inc., molecular weight 8,000, density 970 kg/m$^3$, crystallinity 84%, melting point 127° C., softening point 140° C.)

The pressure inside the polymerizer was adjusted to 0.69 MPa via a control valve on the gas exhaust tube side. While air was introduced, the reaction temperature was maintained at 145° C., the stirring speed was maintained at 250 rotations/min, and the pressure was maintained at 0.69 MPa. The reaction was terminated after five hours, whereby a melt additive Xi was obtained. Here, the crystallinity of the polyethylene was measured by X-ray diffractometry.

(Preparation of Melt Additive Y1)

A melt additive Y1 was obtained in the same manner as the melt additive X1 except that instead of Hi-WAX 800P, Hi-WAX 720P (produced by Mitsui Chemicals, Inc., molecular weight 7,200, density 920 g/m$^3$, crystallinity 60%, melting point 113° C., softening point 118° C.) was used as the polyethylene.

(Melt Additive Evaluation)
(1) $^1$H NMR Spectrum

The obtained melt additive was dissolved in o-dichlorobenzene-d$_4$ at 130° C. A 400 MHz $^1$H NMR spectrum was measured by solution NMR using a Bruker spectrometer AV400 model at 130° C. to measure the area ratio of a peak B observed in the range of 0.6 to 1.0 ppm to a peak A observed in the range of 9.5 to 10 ppm.

(2) Melting Point

The obtained melt additive was subjected to measurement using a differential scanning calorimetry (DSC) device (produced by TA Instruments—Waters LLC, DSC Q20) at a heating rate of 3° C./min in a temperature range of 20° C. to 200° C. in a nitrogen atmosphere.

(3) Molecular Structure Analysis

An NMR spectrum was used to measure the percentages of the structural units (1) to (3).

Here, X in the formula (2) was at least one of a hydroxy group, a carboxy group, or an ether group (having an alkyl group bonded thereto).

(4) Weight Average Molecular Weight Measurement

The weight average molecular weight was measured by a method in conformity with JIS-K-7367-1 (viscosity method).

(Preparation of Melt Additives X2 and X3)

Melt additives X2 and X3 were obtained by adjusting the molecular structure, the weight average molecular weight (Mw), and the melting point as shown in Table 1. The raw material polyethylenes used were as follows.

Melt additive X2: polyethylene (molecular weight: 900, density: 950 kg/m$^3$, crystallinity: 90%, melting point: 116° C., softening point: 121° C.)

Melt additive X3: polyethylene (molecular weight: 2,000, density: 970 kg/m$^3$, crystallinity: 87%, melting point: 122° C., softening point: 130° C.)

(Preparation of Melt Additives Y2 and Y3)

Melt additives Y2 and Y3 were obtained by adjusting the molecular structure, the weight average molecular weight (Mw), the melting point as shown in Table 1. The raw material polyethylenes used were as follows.

Melt additive Y2: polyethylene (molecular weight: 4,000, density: 930 kg/m$^3$, crystallinity: 70%, melting point: 113° C., softening point: 118° C.)

Melt additive Y3: polyethylene (molecular weight: 3,000, density: 930 kg/m$^3$, crystallinity: 65%, melting point: 109° C., softening point: 114° C.)

EXAMPLE 1

A resin composition for molding was obtained by uniformly mixing, in a super mixer, 100 parts by mass of the chlorinated polyvinyl chloride resin A with 2.0 parts by mass of an organotin stabilizer (produced by Nitto Kasei Co., Ltd., TVS#1380) as a thermal stabilizer, 4.0 parts by mass of titanium oxide (produced by Venator Materials PLC, R-TC30) as inorganic matter, and 3.0 parts by mass of the melt additive X.

EXAMPLES 2 to 7

A resin composition for molding was obtained as in Example 1 except that the type of the chlorinated polyvinyl chloride resin. and the type and amount of the melt additive added were changed as shown in Table 1.

Comparative Example 1

A resin composition for molding was obtained as in Example 1 except that the melt additive Y1 was used.

Comparative Examples 2 and 3

A resin composition for molding was obtained as in Example 1 except that the type and the amount of the melt additive added were changed as shown in Table 1.
(Evaluation)

The resin compositions for molding obtained in the examples and the comparative examples were evaluated as follows. Table 1 shows the results.
(Evaluation of resin composition for molding)
(1) Pulse NMR Measurement The obtained powdery resin composition for molding was placed in a glass sample tube having a diameter of 10 mm (produced by BRUKER, Product No. 1824511, 10 mm in diameter, 180 mm in length, flat bottom) so as to fall within the measurement range of a pulse NMR apparatus. The sample tube was set in the pulse NMR apparatus (produced by BRUKER, "the minispec mq20") and subjected to measurement by the solid echo method at 100° C. (after holding for 20 minutes) under the conditions below, thereby obtaining a free induction decay curve of $^1$H spin-spin relaxation.
<Solid echo method>
  Scans: 128 times
  Recycle delay: 1 sec
  Acquisition scale: 1.0 ms
(Measurement at 100° C.)

The free induction decay curve up to 0.5 ms obtained at 100° C. was subjected to waveform separation into three curves derived from the $A_{100}$ component, the $B_{100}$ component, and the $C_{100}$ component. The waveform separation was performed by fitting to both a Gaussian model and an exponential model. The percentages of the three components were determined from the curves derived from the components obtained in the measurement.

Using analysis software "TD-NMRA (Version 4.3, Rev. 0.8)" produced by BRUKER, a Gaussian-model fitting was applied to the $A_{100}$ component, and an exponential model fitting was applied to the $B_{100}$ component and $C_{100}$ component in conformity with the product manual.

The following equation was used in the fitting.

$$Y = A \times \exp\left(-\frac{1}{2} \times \left(\frac{t}{T_A}\right)^2\right) + B \times \exp\left(-\frac{1}{2} \times \left(\frac{t}{T_B}\right)^2\right) + C \times \exp\left(-\frac{t}{T_C}\right) \quad \text{[Math. 1]}$$

In the formula, A represents the percentage of the $A_{100}$ component, B represents the percentage of the $B_{100}$ component, C represents the percentage of the $C_{100}$ component, $T_A$ represents the relaxation time of the $A_{100}$ component, $T_B$ represents the relaxation time of the $B_{100}$ component, $T_C$ represents the relaxation time of the $C_{100}$ component, and t represents time.

The $A_{100}$ component, the $B_{100}$ component, and the $C_{100}$ component are components defined in order of shorter relaxation time in pulse NMR measurement. The value of the relaxation time of each component is not limited.

(2) Surface Smoothness
(Preparation of Extrusion-Molded Article)

The obtained resin composition for molding was fed to a single screw 65-mm extruder (produced by Ikegai Corporation, "FS-65 mm") and formed into flat plate-shaped molded articles, each having a thickness of 2 mm and a width of 20 mm, at a resin temperature of 190° C. to 200° C. and an extrusion amount of 20 to 25 kg/hr.

A surface of a molded article obtained 15 minutes after the start of molding was subjected to measurement of the arithmetic average wavelength (Zλa) using a 3D measurement system (produced by Keyence Corporation, VR-3100).
(3) Presence or Absence Of Deposits During Molding In "(2) Surface smoothness", the presence or absence of deposits on a forming tube five hours after the start of molding was visually determined. "o (Good)" was given when no deposit was observed, and "x (Poor)" was given when deposits were observed.

A forming tube is a fixture secured at the end of an extruder and used to adjust the shape of a molded article. When deposits on a molded article surface adhere to a forming tube during extrusion molding, the shape of the molded article cannot be adjusted, causing defective molding.
(4) Continuous Productivity Further, a surface of a molded article obtained five hours after the start of molding was similarly subjected to the measurement of the arithmetic average wavelength (Zλa). The continuous productivity was evaluated as "o (Good)" when the change in the Zλa from after 15 minutes to after 5 hours was within ±110%, and "x (Poor)" when the Zλa changed more than ±10%.
(5) Charpy Impact Value An obtained molded article was cut to prepare a specimen (width 10 mm×length 90 mm×thickness 3 mm×notch depth 1 mm) in conformity with JIS K 7111-1:2012. This specimen was subjected to impact value measurement using "U-F IMPACT TESTER SEPT. 1972" produced by Ueshima Seisakusho Co., Ltd. at a temperature of 23° C. The measurement was repeated four times, and each obtained impact value was divided by the thickness of the specimen.

The average of the quotients was taken as the Charpy impact value of the molded article, and evaluated in accordance with the following criteria.
  o (Good): a Charpy impact value of 5 KJ/m$^2$ or more
  x (Poor): a Charpy impact value of less than 5 KJ/m$^2$
(6) Crack Test An obtained molded article was cut to a length of 150 mm to prepare a specimen. This specimen was used to measure crack properties at a temperature of 23° C. using "SHIMADZU AUTOGRAPH AGS", produced by Shimadzu Corporation. A three-point bend fixture to apply a load to the center of the specimen was used. The loading member was descended by 20 mm at a descent speed of 3 ram/min to apply a load, and the specimen was held for 10 minutes with the load applied thereto. The presence or absence of crack(s) was visually determined, and evaluated in accordance with the following criteria.

High entanglement in particles of a molded article allows excellent melting and large plastic deformation before breakage, resulting in ductility. Small plastic deformation results in brittleness, causing cracks. The table shows the time until the occurrence of cracking.
  o (Good): No crack was observed.
  x (Poor): Crack(s) was(were) observed.

TABLE 1

| | | | | | Example | | | | | |
|---|---|---|---|---|---|---|---|---|---|---|
| | | | | | 1 | 2 | 3 | 4 | 5 | 6 |
| Resin composition for molding | Chlorinated polyvinyl chloride resin | Amount of added chlorine | | % by mass | 10.6 | 10.6 | 10.6 | 10.6 | 10.6 | 5.3 |
| | | Structure | Structural unit (b) —$CH_2$—$CCl_2$— | mol % | 25.6 | 25.6 | 25.6 | 25.6 | 24.2 | 15.6 |
| | | Weight average molecular weight (Mw) | | — | 142000 | 142000 | 142000 | 142000 | 96600 | 135000 |
| | | Type | | — | A | A | A | A | B | C |
| | | Amount | | parts by mass | 100 | 100.0 | 100.0 | 100.0 | 100.0 | 100.0 |
| | Thermal stabilizer | Organotin thermal stabilizer | | parts by mass | 2.0 | 2.0 | 2.0 | 2.0 | 2.0 | 2.0 |
| | Inorganic matter | Titanium oxide | | parts by mass | 4.0 | 4.0 | 4.0 | 4.0 | 4.0 | 4.0 |
| | Melt additive | Structure | Structural unit (1) —$CH_2$—$CH_2$— | mol % | 95.8 | 95.8 | 95.8 | 87.09 | 95.8 | 95.8 |
| | | | Structural unit (2) —$CH_2$—CHX— | mol % | 4.1 | 4.1 | 4.1 | 12.10 | 4.1 | 4.1 |
| | | | Structural unit (3) —$CH_2$—CHCHO— | mol % | 0.1 | 0.1 | 0.1 | 0.51 | 0.1 | 0.1 |
| | | Before modification | Crystallinity | % | 84.0 | 84.0 | 84.0 | 90.0 | 84.0 | 84.0 |
| | | After modification | Weight average molecular weight (Mw) | — | 8100 | 8100 | 8100 | 920 | 8100 | 8100 |
| | | | Melting point | °C. | 131.8 | 131.8 | 131.8 | 112.4 | 131.8 | 131.8 |
| | | Type | | — | X1 | X1 | X1 | X2 | X1 | X1 |
| | | Amount | | parts by mass | 3.0 | 0.5 | 7.5 | 3.0 | 3.0 | 3.0 |
| | Structural unit (2)/CPVC structural unit (b) | | | — | 0.16 | 0.16 | 0.16 | 0.47 | 0.17 | 0.26 |
| | Molecular weight of melt additive/Molecular weight of CPVC | | | — | 0.06 | 0.06 | 0.06 | 0.01 | 0.08 | 0.06 |
| Evaluation | Melt additive | Solution NMR | Area of peak B/Area of peak A | | 35 | 35 | 35 | 3.5 | 35 | 35 |
| | Resin composition for molding | Pulse NMR | 100° C. Percentage $A_{100}$ | % | 71 | 59 | 57 | 79 | 69 | 63 |
| | | | $B_{100}$ | % | 16 | 13 | 16 | 12 | 19 | 15 |
| | | | $C_{100}$ | % | 13 | 2.6 | 26.9 | 9 | 12.5 | 22 |
| | Molded article | Surface smoothness (arithmetic average wavelength $Z\lambda a$) | | μm | 140 | 145 | 150 | 170 | 121 | 135 |
| | | Deposits (forming side) | | Rating | ○ | ○ | ○ | ○ | ○ | ○ |
| | | Continuous productivity | | Change (%) | 5.0 | 5.5 | 5.3 | 7.6 | 5.8 | 5.2 |
| | | | | Rating | ○ | ○ | ○ | ○ | ○ | ○ |
| | | Charpy impact value | | $KJ/m^2$ | 7.0 | 5.7 | 8.5 | 6.5 | 5.2 | 5.9 |
| | | | | Rating | ○ | ○ | ○ | ○ | ○ | ○ |
| | | Crack test | | Time (min) | 11.2 | 12.7 | 10.6 | 10.8 | 10.1 | 10.5 |
| | | | | Rating | ○ | ○ | ○ | ○ | ○ | ○ |

| | | | | | Example | Comparative Example | | |
|---|---|---|---|---|---|---|---|---|
| | | | | | 7 | 1 | 2 | 3 |
| | Resin composition for molding | Chlorinated polyvinyl chloride resin | Amount of added chlorine | | % by mass | 10.6 | 10.6 | 10.6 | 10.6 |
| | | | Structure | Structural unit (b) —$CH_2$—$CCl_2$— | mol % | 25.6 | 25.6 | 25.6 | 25.6 |
| | | | Weight average molecular weight (Mw) | | — | 142000 | 142000 | 142000 | 142000 |
| | | | Type | | — | A | A | A | A |
| | | | Amount | | parts | 100.0 | 100.0 | 100.0 | 100.0 |
| | | | | | by mass | | | | |
| | | Thermal stabilizer | Organotin thermal stabilizer | | parts by mass | 2.0 | 2.0 | 2.0 | 2.0 |
| | | Inorganic matter | Titanium oxide | | parts by mass | 4.0 | 4.0 | 4.0 | 4.0 |
| | | Melt additive | Structure | Structural unit (1) —$CH_2$—$CH_2$— | mol % | 93.01 | 70.30 | 99.81 | 75.17 |
| | | | | Structural unit (2) —$CH_2$—CHX— | mol % | 6.61 | 29.66 | 0.01 | 23.70 |
| | | | | Structural unit (3) —$CH_2$—CHCHO— | mol % | 0.01 | 0.0 | 0.01 | 0.82 |
| | | | Before modification | Crystallinity | % | 87.0 | 60.0 | 70.0 | 65.0 |
| | | | After modification | Weight average molecular weight (Mw) | — | 2200 | 7410 | 4050 | 3100 |

TABLE 1-continued

|  |  |  |  |  |  |  |  |  |  |
|---|---|---|---|---|---|---|---|---|---|
|  |  | cation | Melting point |  | ° C. | 118.7 | 97.4 | 108.1 | 96.0 |
|  |  | Type |  |  | — | X3 | Y1 | Y2 | Y3 |
|  |  | Amount |  |  | parts by mass | 3.0 | 3.0 | 3.0 | 3.0 |
|  | Structural unit (2)/CPVC structural unit (b) |  |  |  | — | 0.26 | 1.16 | 0.0004 | 0.93 |
|  | Molecular weight of melt additive/Molecular weight of CPVC |  |  |  | — | 0.02 | 0.05 | 0.03 | 0.02 |
| Evaluation | Melt additive | Solution NMR | Area of peak B/Area of peak A |  |  | 470 | 1150 | 1062 | 620 |
|  | Resin composition for molding | Pulse NMR | 100° C. | Percentage | $A_{100}$ % | 61 | 55 | 53 | 55 |
|  |  |  |  |  | $B_{100}$ % | 10 | 12 | 12 | 13 |
|  |  |  |  |  | $C_{100}$ % | 29 | 33 | 35 | 32 |
|  | Molded article | Surface smoothness (arithmetic average wavelength Zλa) |  |  | μm | 144 | 420 | 361 | 398 |
|  |  | Deposits (forming side) |  |  | Rating | ○ | x | x | x |
|  |  | Continuous productivity |  |  | Change (%) | 5.6 | 16.7 | 11.1 | 14.3 |
|  |  |  |  |  | Rating | ○ | x | x | x |
|  |  | Charpy impact value |  |  | KJ/m² | 6.7 | 4.0 | 4.5 | 4.5 |
|  |  |  |  |  | Rating | ○ | x | x | x |
|  |  | Crack test |  |  | Time (min) | 11.0 | 9.1 | 9.9 | 9.2 |
|  |  |  |  |  | Rating | ○ | x | x | x |

INDUSTRIAL APPLICABILITY

The present invention can provide a resin composition for molding that makes it possible to achieve excellent continuous productivity and to produce a molded article having high surface smoothness, capable of reducing defective molding, less likely to crack during use, and also having excellent shock resistance. The present invention can also provide a molded article including the resin composition for molding.

The invention claimed is:

1. A resin composition for molding, comprising:
a chlorinated polyvinyl chloride resin; and
a melt additive,
the resin composition containing three components including a $A_{100}$ component, a $B_{100}$ component, and a $C_{100}$ component, and having a percentage of the $C_{100}$ component [$C_{100}$ component/($A_{100}$ component+$B_{100}$ component+$C_{100}$ component)] of 30% or less, the three components being identified by measuring the resin composition by a solid echo method using pulse NMR at 100° C. to give a free induction decay curve of ¹H spin-spin relaxation, and subjecting the free induction decay curve to waveform separation into three curves derived from the $A_{100}$ component, the $B_{100}$ component, and the $C_{100}$ component in order of shorter relaxation time using the least square method, and
the melt additive containing structural units represented by the following formulas (1) to (3):

wherein, in the formula (2), X represents at least one selected from the group consisting of an alkyl group, a halogen group, a carboxy group, a hydroxy group, an acetyl group, an acryloyl group, a cyano group, an acrylamide group, a phenyl group and an ether group.

2. The resin composition for molding according to claim 1,
wherein the melt additive has an area ratio of a peak B observed in a range of 0.6 to 1.0 ppm to a peak A observed in a range of 9.5 to 10 ppm (Area of peak B/Area of peak A) of 1 to 1,000 when a ¹H NMR spectrum is measured by solution NMR.

3. A molded article molded from the resin composition for molding according to claim 1.

4. A molded article molded from the resin composition for molding according to claim 2.

5. The resin composition for molding according to claim 1,
wherein the melt additive has a proportion of the structural unit (3) of 0.001 to 1 mol % with respect to the total number of moles of the structural units (1) to (3).

6. The resin composition for molding according to claim 1,
wherein the melt additive has a weight average molecular weight of 800 to 1,000,000.

7. The resin composition for molding according to claim 1,
wherein the chlorinated polyvinyl chloride resin contains structural units (a) to (c) represented by the following formulas (a) to (c):

8. The resin composition for molding according to claim 7,
wherein a ratio of the structural unit (2) content of the melt additive to the structural unit (b) content of the chlorinated polyvinyl chloride resin (Structural unit (2) content of melt additive/Structural unit (b) content of chlorinated polyvinyl chloride resin) is 0.01 to 1.0.

* * * * *